(12) United States Patent
Ota (10) Patent No.: US 12,548,369 B2
(45) Date of Patent: Feb. 10, 2026

(54) IMAGE STORAGE SYSTEM AND IMAGE STORAGE METHOD THAT MASKS THE FACE OF A SUBJECT INCLUDED IN THE CAPTURED IMAGE AND GENERATES A PROCESSED IMAGE THAT INDICATES THE ORIENTATION OF THE FACE (71) Applicant: TOYOTA JIDOSHA KABUSHIKI KAISHA, Toyota (JP)

(72) Inventor: Yasutoshi Ota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 18/343,034

(22) Filed: Jun. 28, 2023

(65) Prior Publication Data
US 2024/0013570 A1 Jan. 11, 2024

(30) Foreign Application Priority Data
Jul. 8, 2022 (JP) .................. 2022-110667

(51) Int. Cl.
G06V 40/16 (2022.01)
G06T 7/20 (2017.01)
G06T 7/73 (2017.01)

(52) U.S. Cl.
CPC .............. *G06V 40/161* (2022.01); *G06T 7/20* (2013.01); *G06T 7/75* (2017.01); *G06T 2207/30241* (2013.01)

(58) Field of Classification Search
CPC combination set(s) only.
See application file for complete search history.

(56) References Cited

U.S. PATENT DOCUMENTS

2018/0330619 A1 11/2018 Shimizu

FOREIGN PATENT DOCUMENTS

| JP | 2013-032949 A | 2/2013 | |
|---|---|---|---|
| JP | 2017-135695 A | 8/2017 | |
| JP | 2018-106288 A | 7/2018 | |
| JP | 2018-528536 A | 9/2018 | |
| JP | 2021-089529 A | 6/2021 | |
| JP | 2021-176235 A | 11/2021 | |
| WO | WO2017040519 A1 * | 3/2017 | ............ G06K 9/36 |

* cited by examiner

*Primary Examiner* — Vu Le
*Assistant Examiner* — Matthew James Bodnark
(74) *Attorney, Agent, or Firm* — Sughrue Mion, PLLC (57) ABSTRACT An image storage system includes: an acquisition unit that acquires a captured image of a surrounding environment and three-dimensional information; a derivation unit that detects the face of a subject included in the captured image and derives the orientation of the detected face of the subject from the three-dimensional information; an image processing unit that masks the face of the subject included in the captured image and generates a processed image obtained by adding information indicating the orientation of the face to data of the captured image; and a storage unit that stores data of the processed image generated by the image processing unit.

4 Claims, 6 Drawing Sheets

IMAGE STORAGE SYSTEM AND IMAGE STORAGE METHOD THAT MASKS THE FACE OF A SUBJECT INCLUDED IN THE CAPTURED IMAGE AND GENERATES A PROCESSED IMAGE THAT INDICATES THE ORIENTATION OF THE FACE

BACKGROUND OF THE INVENTION

1. Field of the Invention

The present disclosure relates to technology for processing and storing captured images of the surrounding environment.

2. Description of the Related Art

The drive recorder described in Patent Document 1 includes: an image extraction unit that extracts an area where other vehicles are photographed from an image captured by a camera mounted on a vehicle; and an image processing unit that converts the area where other vehicles are photographed into a vehicle feature image reflecting features related to a type of vehicle and superimposes an occupant feature image reflecting features of occupants of the vehicle on the vehicle feature image. The occupants of the vehicle are classified as adult males and/or adult females.

[Patent Document 1] Japanese Patent Application Publication NO. 2021-176235

When a subject on the road is included in a captured image, it is desirable to mask the face of the subject in order to protect the privacy of the subject. However, masking the subject's face makes it difficult to read the subject's intention to indicate the future direction of travel.

SUMMARY OF THE INVENTION

A purpose of the present disclosure is to provide technology for leaving useful information for the prediction of the behavior of a subject while masking the subject's face.

An image storage system according to one embodiment of the present disclosure includes: an acquisition unit that acquires a captured image of a surrounding environment and three-dimensional information; a derivation unit that detects the face of a subject included in the captured image and derives the orientation of the detected face of the subject from the three-dimensional information; an image processing unit that masks the face of the subject included in the captured image and generates a processed image obtained by adding information indicating the orientation of the face to data of the captured image; and a storage unit that stores data of the processed image generated by the image processing unit.

Another embodiment of the present disclosure relates to an image storage method. This method is an image storage method including the following executed by a computer: acquiring a captured image of a surrounding environment and three-dimensional information; detecting the face of a subject included in the captured image and deriving the orientation of the detected face of the subject from the three-dimensional information; masking the face of the subject included in the captured image and generating a processed image obtained by adding information indicating the orientation of the face to data of the captured image; and storing data of the generated processed image.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
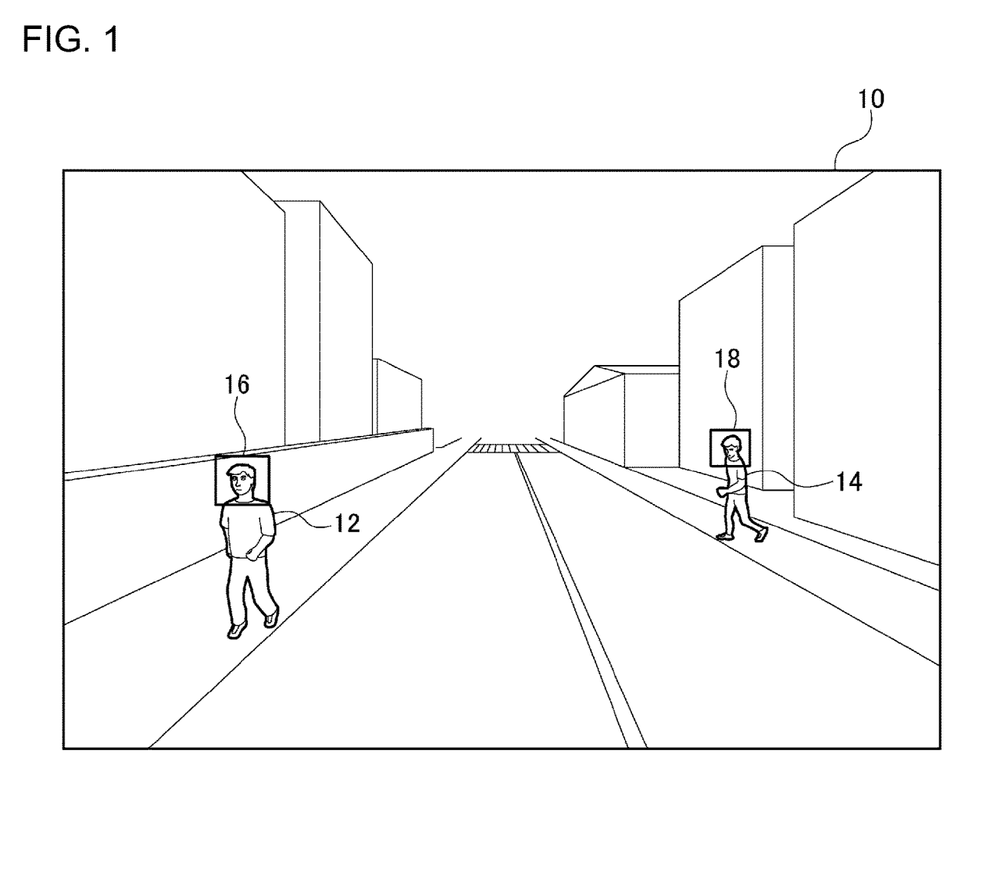
FIG. 1 is a diagram showing a captured image of the surrounding environment of a vehicle.

FIG. 1 is a diagram showing a captured image 10 of the surrounding environment of a vehicle. The captured image 10 is generated by capturing an image of an area in front of the vehicle by a camera mounted on the vehicle. FIG. 1 shows the captured image 10 of an area in front of the vehicle. However, this is non-limiting, and the image may be a captured image of a rear area of the vehicle or a side area of the vehicle.

A subject 12 and a subject 14 are shown in the captured image 10. The subject 12 is heading forward along the sidewalk, and the subject 14 is heading toward the road from the sidewalk. A face recognition process has been performed for the captured image 10, and a detection frame 16 surrounding the face of subject 12 and a detection frame 18 surrounding the face of subject 14 have been added.

The captured image 10 is processed and transmitted to a server device and used for vehicle driving assistance. For example, when it is estimated that the subject 14 is about to enter the road, the driver is notified of information indicating the presence of the subject 14 as driving assistance information. The driving assistance information is output through a speaker, a display, or the like. The vehicle may be capable of automatic driving, and the driver assistance information for automatic driving may be generated based on the captured image 10.

Figure 2:
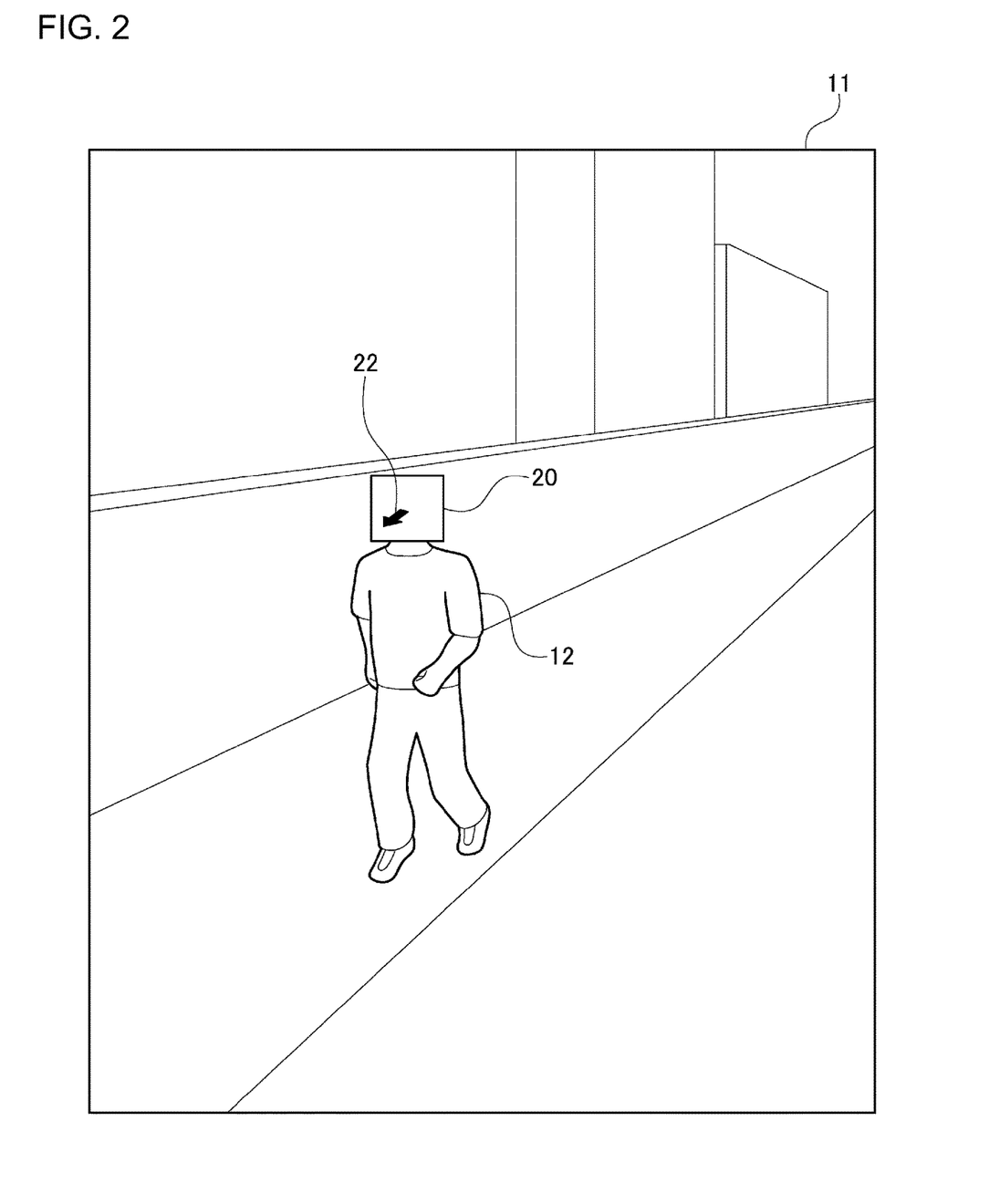
FIG. 2 is a diagram showing a processed image obtained by processing the captured image shown in FIG. 1.

FIG. 2 is a diagram showing a processed image 11 obtained by processing the captured image 10 shown in FIG. 1. FIG. 2 is an enlarged view focusing on the subject 12 of the captured image 10 shown in FIG. 1. For the subject 12 included in the processed image 11, a masking process is applied to an area where the face is located such that the area serves as a masked area 20. This makes it difficult to identify the subject shown in the captured image 10 when the system including the vehicle uses the captured image 10, thus allowing for the protection of personal information.

The subject often turns his/her face in the direction of travel, and information indicating the orientation of the face is useful for collision determination or the like. While the face of the subject 12 is made unidentifiable being in the masked area 20, face orientation information 22 indicating the orientation of the face of the subject 12 is added to the processed image 11. This makes it possible for the vehicle system to learn the orientation of the face of the subject 12 even if the face of the subject 12 is masked, and makes it easier to predict the orientation of travel of the subject 12 based on the face orientation information 22. By processing the captured image 10 in this way, it is possible to make it easier to predict the behavior of the subject 12 while protecting the personal information of the subject 12 shown in the captured image 10. FIGS. 1 and 2 show an example of the subject 12 being a pedestrian. Alternatively, the subject 12 may be a bicyclist.

Figure 3:
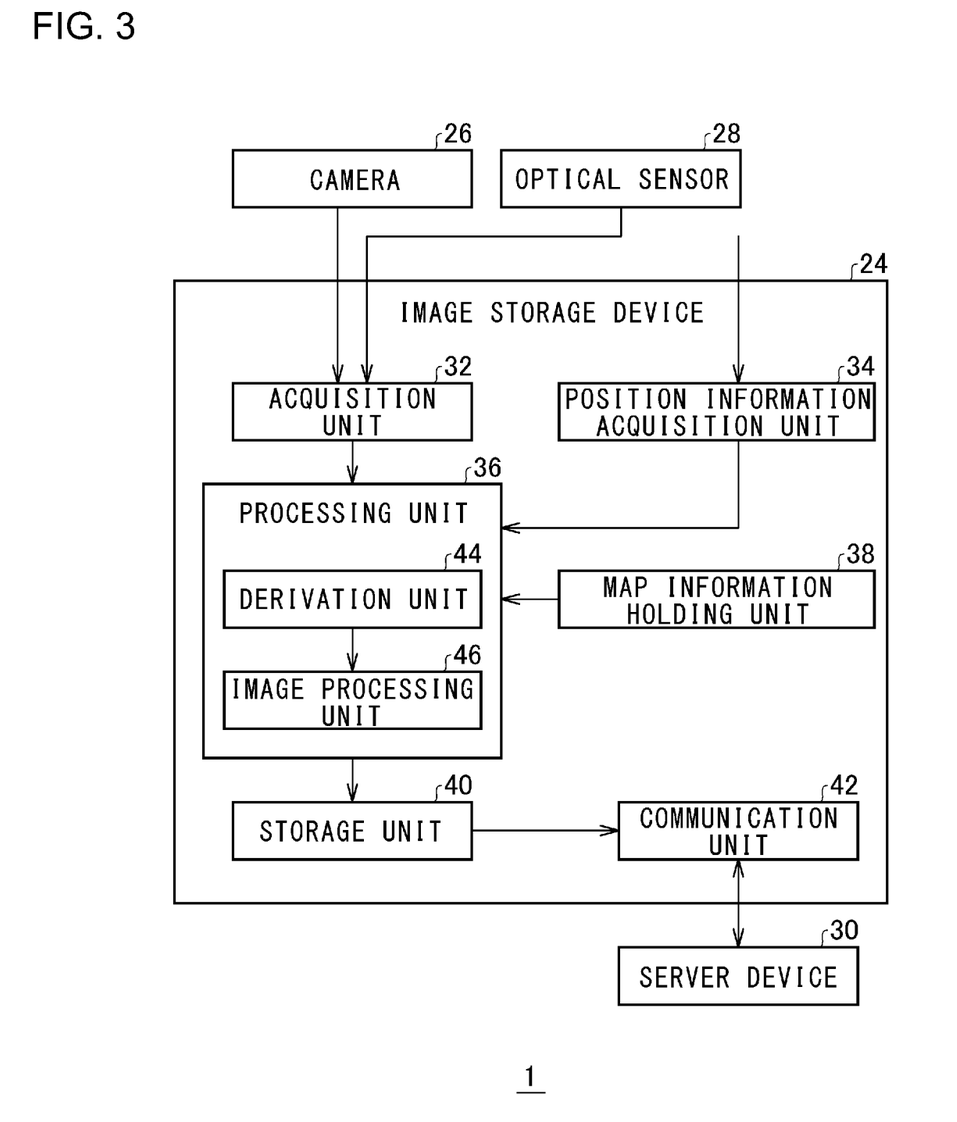
FIG. 3 is a diagram showing the functional structure of an image storage system.

FIG. 3 is a diagram showing the functional structure of an image storage system 1. The functions of the image storage system 1 can be implemented in hardware by any circuit block, main memory, other LSI's, or the like, and in software by system software or applications program loaded in memory, etc. Therefore, a person skilled in the art should appreciate that there are many ways of accomplishing the functions of the image storage system 1 in various forms in accordance with the components of hardware only, software only, or the combination of both, and the way of accomplishing these functions is not limited to any particular one.

The image storage system 1 includes an image storage device 24, a camera 26, an optical sensor 28, and a server device 30. The image storage device 24 has an acquisition unit 32, a position information acquisition unit 34, a processing unit 36, a map information holding unit 38, a storage unit 40, and a communication unit 42.

The camera 26 is mounted on a vehicle, captures an image of the surrounding environment of the vehicle, and transmits the captured image to the image storage device 24. The camera 26 may capture images of not only a front area of the vehicle but also a rear area and a side area of the vehicle.

The optical sensor 28 is, for example, light detection and ranging (LiDAR) and is an optical ranging device. The optical sensor 28 irradiates an object in a measurement range with irradiation light from a laser or the like, receives reflected light from the object in response to the irradiation light, and measures the distance to the object based on a signal according to a light receiving state. The distance to the object is calculated based on the time of the irradiation with the irradiation light and the time of the reception of the reflected light. The direction of the object is determined by the direction of the irradiation with the irradiation light. As described, the optical sensor 28 measures the distance and direction of the object from the vehicle by irradiating the object in the direction of travel of the vehicle. The optical sensor 28 allows three-dimensional information consisting of a point cloud indicating the distance and direction from the vehicle to be obtained. The camera 26 and the optical sensor 28 transmit detection results to the image storage device 24.

The detection results from the camera 26 and the optical sensor 28 are provided with time-synchronized time stamps, and both data can be associated by the time stamps.

The image storage device 24 receives a captured image 10 from the camera 26, applies a masking process to the captured image 10 so as to generate a processed image 11, and transmits the processed image 11 to the server device 30. Information transmitted from the image storage device 24 includes not only the processed image 11 but also vehicle travel information and surrounding environment information detected by an unshown in-vehicle sensor. The in-vehicle sensor may be, for example, a vehicle speed sensor, a shift position detection sensor, a steering angle sensor, a millimeter wave radar, an ultrasonic sensor, or the like. The server device 30 analyzes the processed image 11 received from the image storage device 24 so as to generate driving support information.

The acquisition unit 32 of the image storage device 24 acquires a captured image from the camera 26 and three-dimensional information from the optical sensor 28. A time stamp indicating the detection time is added to the captured image and the three-dimensional information. Therefore, three-dimensional information detected at almost the same time as the captured image can be associated with that captured image.

The position information acquisition unit 34 acquires position information of a vehicle using the Global Navigation Satellite System (GNSS). A time stamp is added to the position information of the vehicle. The position information of the vehicle is indicated by latitude and longitude. The map information holding unit 38 holds map information indicating addresses and roads in association with latitude and longitude. Therefore, it is possible to derive which road the vehicle is traveling on from the position information acquired by the position information acquisition unit 34. The map information also includes road attribute information such as vehicles, sidewalks, crosswalks, etc.

The processing unit 36 performs image processing and has a derivation unit 44 and an image processing unit 46. The derivation unit 44 detects the face of a subject included in the captured image 10 and derives the orientation of the detected face of the subject from the three-dimensional information. The face of the subject is detected by analyzing the captured image 10 using a known face recognition process. The process of detecting the face of the subject from the captured image 10 may be a pattern matching technique or may be performed by a model trained by machine learning. The derivation unit 44 detects the face of the subject and generates the detection frames 16 and 18 as shown in FIG. 1.

Figure 4:
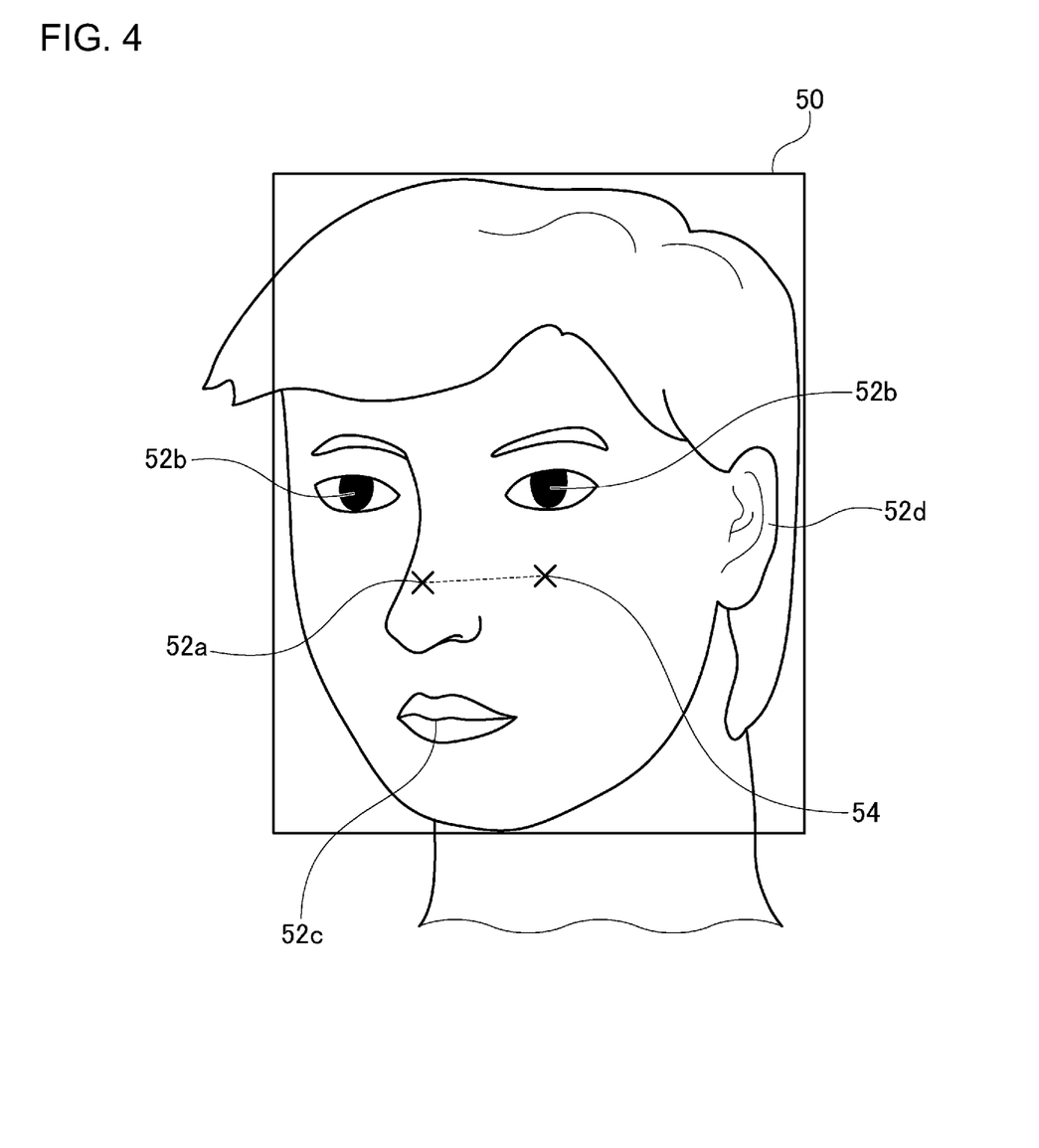
FIG. 4 is a diagram showing a face image and for explaining a process of deriving the orientation of a face.

FIG. 4 is a diagram showing a face image 50 and for explaining a process of deriving the orientation of the face. The derivation unit 44 derives the orientation of the detected face of the subject using the three-dimensional information. The derivation unit 44 derives the subject's facial parts using the three-dimensional information consisting of a point cloud. For example, the derivation unit 44 derives the most prominent part of the point cloud included in the face as the nose and depressed parts as the eyes. The derivation unit 44 may use information indicating the positional relationship of facial parts, and once a specific facial part is derived, the derivation unit 44 derives other facial parts based on the area of the point cloud indicating other concavities and convexities and on information indicating the positional relationship of the face. The derivation unit 44 derives a nose 52*a*, eyes 52*b*, a mouth 52*c*, and ears 52*d* included in the face image 50. The derivation unit 44 may derive only the nose 52*a*. The nose 52*a* may be at the central position of the point cloud area showing a protrusion.

The derivation unit 44 sets a reference position 54 in the face image 50, derives a positional relationship with the facial parts from the reference position 54, and derives the orientation of the face based on the derived positional relationship. The reference position 54 may be set at the center of the face and may be set at the average position of the nose 52*a* on the face facing straight ahead. Briefly, the derivation unit 44 derives the orientation of the face based on the positional relationship between the nose 52*a* and the reference position 54. If the position of the nose 52*a* and the reference position 54 are the same, the face is facing straight ahead.

As shown in FIG. 4, the face is facing right if the nose 52*a* is positioned to the left of the reference position 54 in the left-right direction, and the face is facing the horizontal direction if the nose 52*a* is positioned at the same height as the reference position 54 in the vertical direction. Thus, the derivation unit 44 derives the orientation of the face in the three-dimensional direction according to the positional relationship between the nose 52*a* and the reference position 54. The derivation unit 44 may derive the orientation of the face according to the positional relationship between the middle position of the two eyes 52*b* and the reference position or may derive the orientation of the face according to the positional relationship between the mouth 52*c* and the reference position. The reference position may be set for each facial part. The derivation unit 44 may derive the orientation of the face according to the positional relationship between the respective positions of multiple facial parts and reference positions respectively set for the parts. In any case, the derivation unit 44 derives the facial parts of the subject based on the three-dimensional information and derives the orientation of the face according to the position of the derived facial parts. The derivation unit 44 holds a map or function that associates the positional relationship between the nose 52*a* and the reference position 54 with the orientation of the face, and derives the orientation of the face by inputting the positional relationship between the nose 52*a* and the reference position 54 in the map or the function.

The detectable distance of the optical sensor 28 is several tens of meters, and a person located at a distance that cannot be detected by the optical sensor 28 is excluded from being a subject and excluded from this process.

FIG. 3 is referred back. The image processing unit 46 masks the face of the subject included in the captured image 10, adds information indicating the orientation of the face to the data of the captured image 10, and generates the processed image 11 shown in FIG. 2. The masking process of masking the face of the subject may be a filling process, a blurring process, a process of conversion into a computer graphics face image, or the like. In FIG. 2, the filling process has been performed on the masked area 20. The masked area 20 may be an area inside the detection frames 16 and 18 set by the face recognition process shown in FIG. 1. Although the subject's face image is masked, the subject's body below the shoulders is left unprocessed.

The image processing unit 46 generates the processed image 11 by adding information indicating the orientation of the face, i.e., vector information in the three-dimensional direction, to the captured image 10 while masking the face of the subject. The information indicating the orientation of the face may be a vector with defined yaw, pitch, and roll angles. The derivation unit 44 and the image processing unit 46 execute a process of generating a processed image for each captured image in one frame. In FIG. 2, the information indicating the orientation of the face added to the processed image 11 is indicated by an arrow. The information may be a vector associated with the subject 12.

The image processing unit 46 transmits the generated processed image 11 to the storage unit 40, and the storage unit 40 stores the data of the processed image 11 generated by the image processing unit 46. The communication unit 42 transmits the processed image 11 stored in the storage unit 40 to the server device 30. Thereby, it is possible to transmit the processed image 11 that makes it difficult to identify the subject. The server device 30 can accurately estimate the prediction of the future behavior of the subject based on the orientation of the face of the subject. The communication unit 42 may include the processed image 11 in probe information and transmit the probe information to the server device 30. Probe information includes vehicle ID, time, vehicle speed, vehicle acceleration, vehicle position information, etc., and is periodically transmitted to the server device 30.

Figure 5:
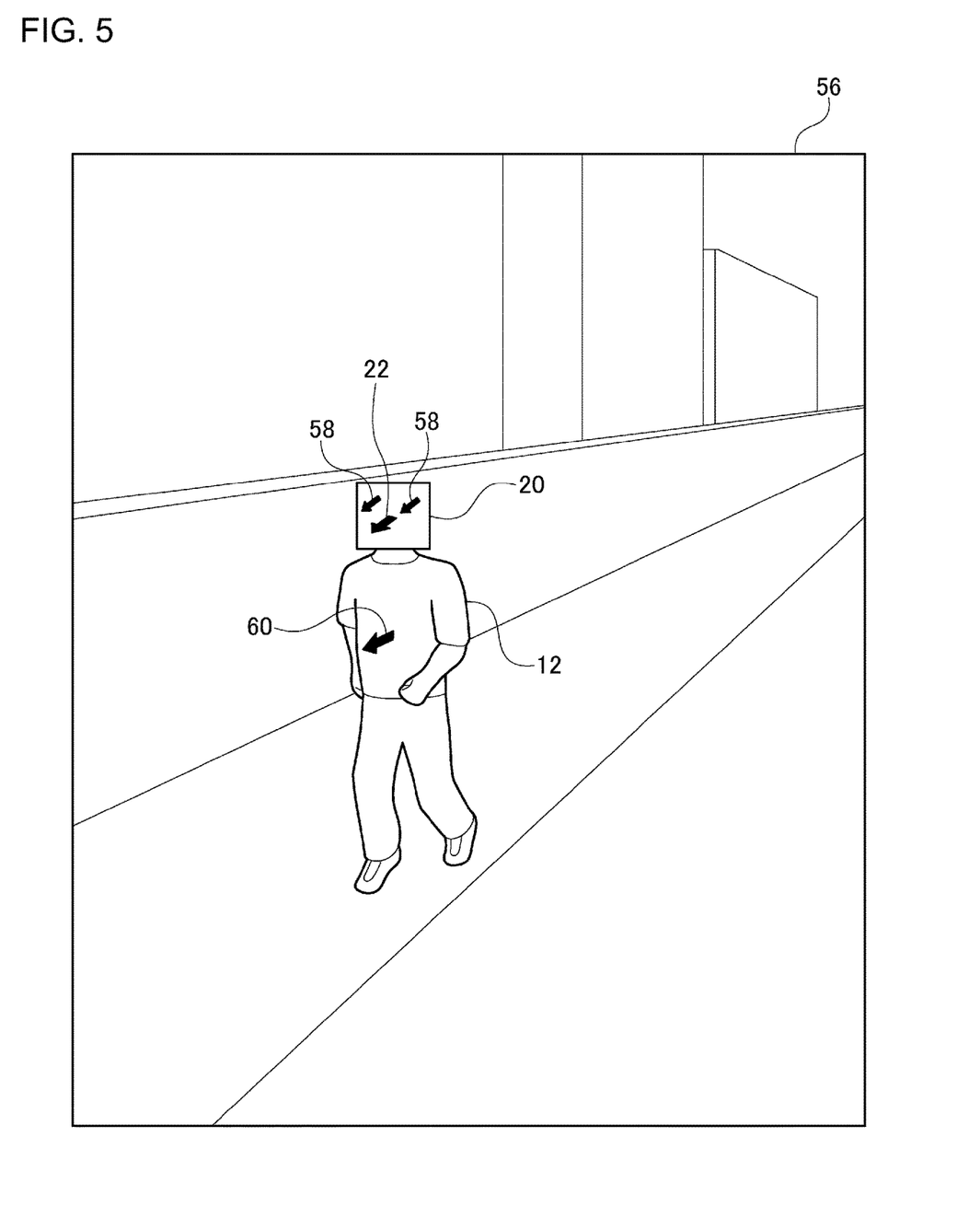
FIG. 5 is a diagram showing a processed image according to an exemplary variation obtained by processing the captured image shown in FIG. 1.

FIG. 5 is a diagram showing a processed image 56 according to an exemplary variation obtained by processing the captured image 10 shown in FIG. 1. The processed image 56 shown in FIG. 5 differs from the processed image 11 shown in FIG. 2 in that line-of-sight information 58 and movement direction information 60 are added.

The derivation unit 44 analyzes the captured image 10 and derives the line-of-sight information 58 based on the position of the iris in the eye. Further, the derivation unit 44 derives the direction of movement of the subject 12 based on captured images 10 in chronological order. The derivation unit 44 derives the direction of movement of the subject 12 by tracking the subject 12 included in the captured images 10 that are in chronological order. The derivation unit 44 assigns an ID to each of subjects and tracks the subjects. The image processing unit 46 adds the line-of-sight information 58 of the subject 12 and the movement direction information 60 of the subject 12 to the data of the processed image 56. Thereby, it is possible to determine whether the subject 12 is walking or stationary and to accurately predict the future behavior of the subject 12.

The image processing unit 46 may add the position information of the subject 12 to the data of the processed image 56. The position information of the subject 12 is calculated based on the position information of the vehicle and the distance and direction from the vehicle of the subject shown in the three-dimensional information. The position information of the subject 12 may include not only latitude and longitude but also road attribute information such as roadway, sidewalk, crosswalk, etc. In other words, information indicating where the subject 12 is on the road is included in the position information of the subject 12. The road attribute information is calculated based on the map information. This allows the possibility of collision with the vehicle to be accurately calculated based on the position information of the subject 12. Further, driving support information to be reported to the driver can be generated using geographical names.

Figure 6:
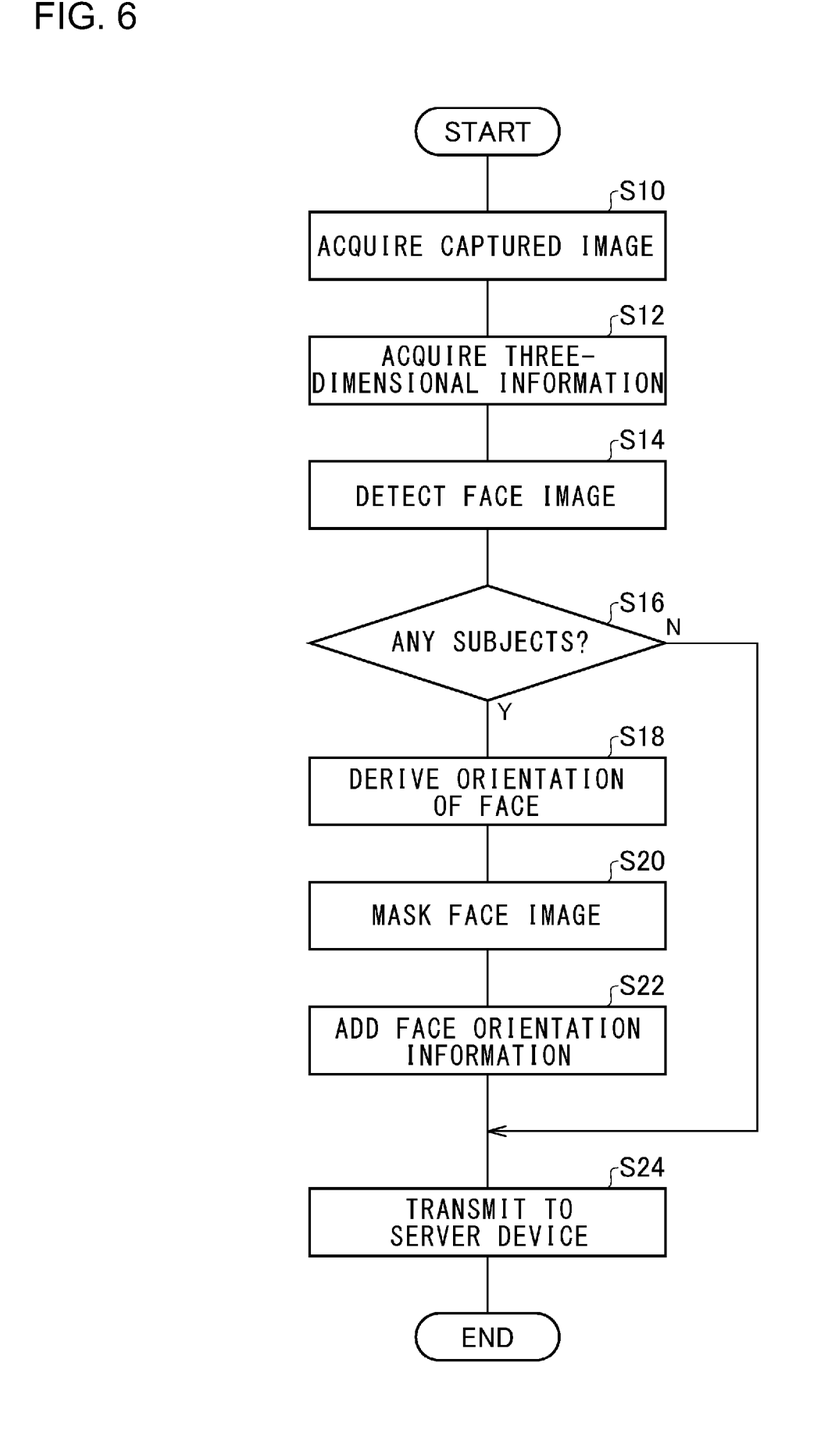
FIG. 6 is a flowchart of an image storage process according to an embodiment.

FIG. 6 is a flowchart of an image storage process according to an embodiment. The acquisition unit 32 acquires a captured image of the environment surrounding the vehicle from the camera 26 (S10) and acquires three-dimensional information by which the environment surrounding the vehicle has been detected from the optical sensor 28 (S12).

The derivation unit 44 executes a face recognition process on the captured image and detects an image of the face of the subject (S14). The derivation unit 44 determines whether there are subjects, that is, whether face images of subjects have been detected (S16). The subjects may be limited to those detected by three-dimensional information, and the derivation unit 44 may determine whether there are subjects for whom three-dimensional information corresponding to face images has been detected.

If there is no subject (N in S16), the image processing unit 46 does not process the captured image, and the communication unit 42 transmits the captured image to the server device 30 (S24). If there is a subject (Y in S16), the derivation unit 44 derives the facial parts of the subject based on the three-dimensional information and derives the orientation of the face according to the position of the derived facial parts (S18).

The image processing unit 46 executes a masking process of masking a face image out of captured images (S20) and generates a processed image by adding information indicating the orientation of the face (S22). The communication unit 42 transmits the generated processed image to the server device 30 (S24). This process is repeated for each captured image.

Described above is an explanation on the present disclosure based on the embodiment. The present disclosure is not limited to the above-mentioned embodiments, and various modifications, such as a design change, may be added thereto on the basis of knowledge of those skilled in the art.

For example, in the embodiment, an aspect is shown where the server device 30 receives a processed image, generates driving support information, and transmits the driving support information to the vehicle. However, this aspect is non-limiting. For example, the server device 30 may calculate the driver's driving skills and driving tendencies by analyzing processed images after the fact.

In the embodiment, as aspect is shown where the optical sensor 28 is a LiDAR. However, this aspect is non-limiting. For example, the optical sensor 28 may be a stereo camera. In any case, the depth of the face of a subject can be calculated based on detection results from the optical sensor 28 so as to identify the facial parts.

In the embodiment, as aspect where processed images are generated on the vehicle side is shown. However, this aspect is non-limiting, and the processed images may be generated on the server device 30 side.

What is claimed is:

1. An image storage system comprising:
   an acquisition unit that acquires a captured image of a surrounding environment captured by a camera and three-dimensional information derived from measuring a distance to a subject by an optical ranging device that irradiates the subject with light and receives light,
   wherein a time stamp, which indicates a detection time, is added to the captured image, and a time stamp, which indicates a detection time, is added to the three-dimensional information, respectively, so that the captured image and the three-dimensional information are associated with each other based on the time stamps;
   a derivation unit that detects a face of the subject included in the captured image and derives an orientation of the detected face of the subject from the three-dimensional information;
   an image processing unit that masks the face of the subject included in the captured image and generates a processed image obtained by adding information indicating the orientation of the face to data of the captured image; and
   a storage unit that stores data of the processed image generated by the image processing unit, wherein
   the derivation unit derives facial parts of the subject based on the three-dimensional information and derives the orientation of the face according to a position of the derived facial parts,
   the image processing unit adds position information of the subject to the data of the processed image, and
   the position information of the subject is calculated based on position information of a vehicle and the distance and direction to the subject from the vehicle in the three-dimensional information.

2. The image storage system according to claim 1, wherein
   the derivation unit derives the direction of movement of the subject based on captured images in chronological order, and
   the image processing unit adds the direction of movement of the subject to the data of the processed image.

3. An image storage method comprising the following executed by a computer:
   acquiring a captured image of a surrounding environment captured by a camera and three-dimensional information derived from measuring a distance to a subject by an optical ranging device that irradiates the subject with light and receives light,
   wherein a time stamp, which indicates a detection time, is added to the captured image, and a time stamp, which indicates a detection time, is added to the three-dimensional information, respectively, so that the captured image and the three-dimensional information are associated with each other based on the time stamps;
   detecting a face of the subject included in the captured image and deriving an orientation of the detected face of the subject from the three-dimensional information;
   masking the face of the subject included in the captured image and generating a processed image obtained by adding information indicating the orientation of the face to data of the captured image; and
   storing data of the generated processed image, wherein
   the deriving derives facial parts of the subject based on the three-dimensional information and derives the orientation of the face according to a position of the derived facial parts,
   the generating of a processed image adds position information of the subject to the data of the processed image, and
   the position information of the subject is calculated based on position information of a vehicle and the distance and direction to the subject from the vehicle in the three-dimensional information.

4. The image storing method according to claim 3, wherein
   the deriving the orientation includes deriving the direction of movement of the subject based on captured images in chronological order, and
   the generating of the processed image includes adding the direction of movement of the subject to the data of the processed image.

* * * * *